(12) United States Patent
Kritzinger (10) Patent No.: US 11,124,140 B2
(45) Date of Patent: Sep. 21, 2021

(54) KART

(71) Applicant: BRP-ROTAX GMBH & CO. KG, Gunskirchen (AT)

(72) Inventor: Thomas Kritzinger, Frankenburg am Hausruck (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 17 days.

(21) Appl. No.: 16/229,560

(22) Filed: Dec. 21, 2018

(65) Prior Publication Data
US 2019/0202389 A1   Jul. 4, 2019

(30) Foreign Application Priority Data

Dec. 29, 2017   (AT) .............................. A 51091/2017

(51) Int. Cl.
*B60R 19/42*   (2006.01)
*B60R 19/30*   (2006.01)
(Continued)

(52) U.S. Cl.
CPC .............. *B60R 19/42* (2013.01); *B60R 19/30* (2013.01); *B60R 19/38* (2013.01); *B62D 21/183* (2013.01);
(Continued)

(58) Field of Classification Search
CPC ......... B60R 19/42; B60R 19/30; B60R 19/38; B60R 2021/0086; B60R 2019/262; B62D 21/183; B60Y 2200/114
(Continued)

(56) References Cited

U.S. PATENT DOCUMENTS

| | | | | |
|---|---|---|---|---|
| 4,838,592 A | * | 6/1989 | Sobodos | A63G 25/00 293/102 |
| 5,184,694 A | * | 2/1993 | Magrath, Jr. | A63G 25/00 180/167 |
| 5,806,901 A | * | 9/1998 | Tennyson | B60R 19/26 293/122 |

FOREIGN PATENT DOCUMENTS

| | | |
|---|---|---|
| DE | 29700456 U1 | 3/1998 |
| EP | 2204303 B1 | 1/2012 |

(Continued)

OTHER PUBLICATIONS

English Abstract of EP2246221B1 retrieved from https://worldwide.espacenet.com/ on Dec. 18, 2018.
(Continued)

*Primary Examiner* — D Glenn Dayoan
*Assistant Examiner* — E Turner Hicks
(74) *Attorney, Agent, or Firm* — BCF LLP (57) ABSTRACT

A kart includes a frame, front and rear wheels rotatable about front and rear axle axes, and an impact protection structure surrounding the frame. The impact protection structure includes: at least one front protective element, at least one rear protective element, and at least one lateral protective element on each lateral side of the kart. Each of the at least one lateral protective element is mounted to a pivot bearing fixed to the frame so as to be pivotally adjustable about a frame vertical axis, and is disposed closer to the rear axle axis than to the front axle axis. Each of the pivot bearings includes a bearing block and a bearing pedestal pivotable relative to the bearing block. Each of the at least one lateral protective element engages the bearing pedestal of a corresponding pivot bearing. Shock-absorbing dampers are disposed between the frame and the protective elements.

20 Claims, 5 Drawing Sheets

(51) Int. Cl.
  *B60R 19/38*   (2006.01)
  *B62D 21/18*   (2006.01)
  *B60R 21/00*   (2006.01)

(52) U.S. Cl.
  CPC . *B60R 2021/0086* (2013.01); *B60Y 2200/114* (2013.01)

(58) Field of Classification Search
  USPC ................ 293/127, 136, 126, 132, 155, 131
  See application file for complete search history.

(56)             References Cited

FOREIGN PATENT DOCUMENTS

| EP | 2246221 B1    | 1/2014  |
|----|---------------|---------|
| EP | 2808205 A1    | 12/2014 |
| WO | 03057538 A1   | 7/2003  |

OTHER PUBLICATIONS

English Abstract of EP2204303B1 retrieved from https://worldwide.espacenet.com/ on Dec. 18, 2018.
English translation of DE29700456U1 retrieved from http://translationportal.epo.org/ on Jan. 24, 2020.
Extended European Search Report from the EPO dated Feb. 11, 2019 in connection with the European corresponding application No. 18213384.3.

* cited by examiner

KART

CROSS-REFERENCE

The present application claims priority from Austrian Patent Application A51091/2017, filed Dec. 29, 2017, the entirety of which is incorporated by reference herein.

FIELD OF THE TECHNOLOGY

The present technology relates to karts.

BACKGROUND

Karts implement protective elements such as bumpers that fully or partially enclose the front, rear and lateral sides of a frame of the kart. Such protective elements are used in karts to dampen impact loads on the frame and the driver in the event of a collision and thus protect both the driver and the vehicle from damage caused by impact forces.

For this purpose, vehicles, in particular karts, are usually equipped with bumpers connected to their chassis. In the event of an impact, bumpers and/or shock-absorbing rubber-elastic dampers are deformed elastically or plastically, whereby the kinetic energy of the impact is at least partially absorbed. Such devices are known for example from U.S. Pat. No. 5,806,901 A and PCT Patent Application Publication No. WO 03/057538 A1.

The use of bumpers is particularly necessary for karts used for rental, as vehicles used for rental are usually not treated gently and are therefore considerably overstressed.

To ensure that neither the frame or body parts are unduly affected in the course of such treatment, karts are usually equipped not only with front and rear bumpers attached to the frame, but also with bumpers on the lateral sides. These bumpers thus help avoid repairs or the replacement of damaged kart components.

A protective element should return elastically to its non-deformed ready position after an impact deforming the protective element. The protective elements should be held securely on the frame and should safely dissipate impulse peaks acting on the kart. For this purpose, shock-absorbing, rubber-elastic dampers can be provided between the protective element and the frame, consisting for example of deformable rubber elements such as the ones taught by European Patent Application No. 2 204 303 A. This solution has the disadvantage that the dampers used are relatively expensive, as they all transfer normal and transverse forces to the frame. Because such dampers are subject to aging over time and thus partially lose their mechanical properties, they must be replaced at regular intervals in order to achieve the desired damping effect.

It is also known that karts can be fitted with shock absorbers located between the frame and the protective element (as taught by European Patent Application No. 2 246 221 A for example). These shock absorbers only transmit forces in the direction of the longitudinal axis of the vehicle and can therefore only absorb impact forces resulting from a frontal impact, which is also a disadvantage of such solutions. Transverse components of the impact forces can even damage such shock absorbers.

There is therefore a desire for a kart of having side impact protection that can absorb normal and transverse forces well and is nevertheless held securely on the frame.

SUMMARY

The present technology relates to a kart having a frame, front and rear wheels rotatable about front and a rear axle axes respectively, and an impact protection structure surrounding the frame and having at least one front protective element, at least one rear protective element and at least one lateral protective element on each lateral side of the kart, a plurality of shock-absorbing dampers being disposed between the frame and the at least one front protective element, the at least one rear protective element, and the at least one lateral protective element on each lateral side of the kart.

The present technology at least partially addresses the aforementioned drawbacks in that each of the at least one lateral protective element is mounted to a pivot bearing fixed to the frame so as to be pivotally adjustable about a frame vertical axis, wherein each of the pivot bearings is preferably disposed closer to the rear axle axis than to the front axle axis, and each of the pivot bearings having a bearing block fixed to the frame and a bearing pedestal pivotable relative to the bearing block, wherein each of the at least one lateral protective element engages the bearing pedestal of a corresponding one of the pivot bearings. This ensures that a side impact protection structure of the kart transmits impact-related normal and transverse forces into the frame in a well-damped manner, while the pivot bearing ensures that they are always held securely on the frame and guided in a defined manner relative to the frame. In the event of a force acting on a lateral protective element, the protective element is displaced around the pivot bearing axis, a frame vertical axis, against the spring force of rubber-elastic dampers against the frame. The protective element is designed in particular in the form of a single-arm lever which can be pivoted freely or damped via the pivot bearing on the frame. If the pivot bearing is provided near the rear axle, practically in the wheel well, it is also protected against direct impact loading.

In some embodiments, in order to ensure that the pivot bearing actually only performs pivoting movements and is protected against excessive impact loading, each of the at least one lateral protective elements is bent outwards in a central region of the kart between the front and rear axle axes in a direction of a frame transverse axis, curved outwards or the like, and is drawn in towards a frame longitudinal axis near the front and rear axle axes. In most practical cases, any impact load first acts on the lateral protective element in the area of the greatest distance between the wheel well and the frame longitudinal axis and not in the vicinity of the pivot bearing.

In some embodiments, in order to be able to absorb the impact forces, the shock-absorbing dampers are buffers, and at least one of the buffers is disposed between the frame and each of the at least one lateral protective element in a central region of the kart between the front and rear axle axes. The number and damping performance of the rubber-elastic dampers used in each case must be adapted to the design of the kart and the intended use of the kart.

In some embodiments, the shock-absorbing dampers can be buffers which are attached to one side of the frame and transmit only normal forces and practically no transverse forces, since they are not connected to the assigned protective element. The shock-absorbing dampers may also be rubber-elastic bearings transmitting normal and transverse forces, which are connected on the one hand to the frame and on the other hand to a corresponding protective element.

In some embodiments, each of the at least one lateral protective element can be connected to the at least one front protective element and the at least one rear protective element via connecting protective elements. In some embodiments, each of the at least one lateral protective element is connected to a corresponding one of the connecting protective elements via the bearing pedestal of the corresponding one of the pivot bearings. This may ensure that the wheels and wheel axles are also protected against accidental excessive impact loads.

In some embodiments, each of the protective elements is affixed to a corresponding one of the connecting protective elements via a screw connection to improve the maintainability of the kart. Since the protective elements can also be permanently deformed due to impact, or are intentionally screwed together under a certain preload, in some embodiments these screw connections allow a certain amount of play when the screws and nuts are fitted. To that end, in some embodiments, each screw connection includes: a nut which is radially secured and held rotationally fixed in a recess of a selected one of the protective elements; and a washer which is radially secured in a recess of a corresponding one of the connecting protective elements to be connected to the selected one of the protective elements. The corresponding one of the connecting elements has a conical seat for a conical seat screw which engages the nut. The conical seat ensures proper mutual alignment of the protective elements to be screwed together.

In some embodiments, the shock-absorbing dampers are buffers. At least one of the buffers acting as a rubber-elastic damper is disposed between the frame and the at least one front protective element. These buffers are relatively inexpensive and can be changed quickly.

In some embodiments, the kart also includes at least one rubber-elastic bearing disposed between the frame and the front protective element or one of the connecting protective elements. Rubber-elastic bearings can also transmit transverse forces and thus ensure that the impact protection is properly held in position even at a greater distance from the pivot bearing fixed to the frame.

In some embodiments, the shock-absorbing dampers are buffers. At least one of the buffers acting as a rubber-elastic damper is disposed between the frame and the at least one rear protective element.

The engine is located in a rear area of the kart and requires protection. As such, in some embodiments, the at least one rear protective element is mounted to longitudinal guides connected to the frame and is guided relative to the frame by the longitudinal guides against a spring force of the at least one of the buffers in the direction of a frame longitudinal axis. An undefined evasion of the rear protective element in the event of an impact load can thus be avoided.

In some embodiments, the shock-absorbing dampers are buffers. The buffers may be nipple-shaped. Each of the buffers has a mounting body and a buffer body projecting from the mounting body. The buffer body forms a stop for interacting with a corresponding one of the protective elements on a side of the buffer body opposite the mounting body. The buffer body is made of elastic material.

In some embodiments, the buffer body is made of rubber or elastomeric foam.

In some embodiments, the shock-absorbing dampers comprise elastic material.

In some embodiments, the elastic material is rubber.

In some embodiments, the front and rear wheels are disposed inside and protected by the impact protection structure.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
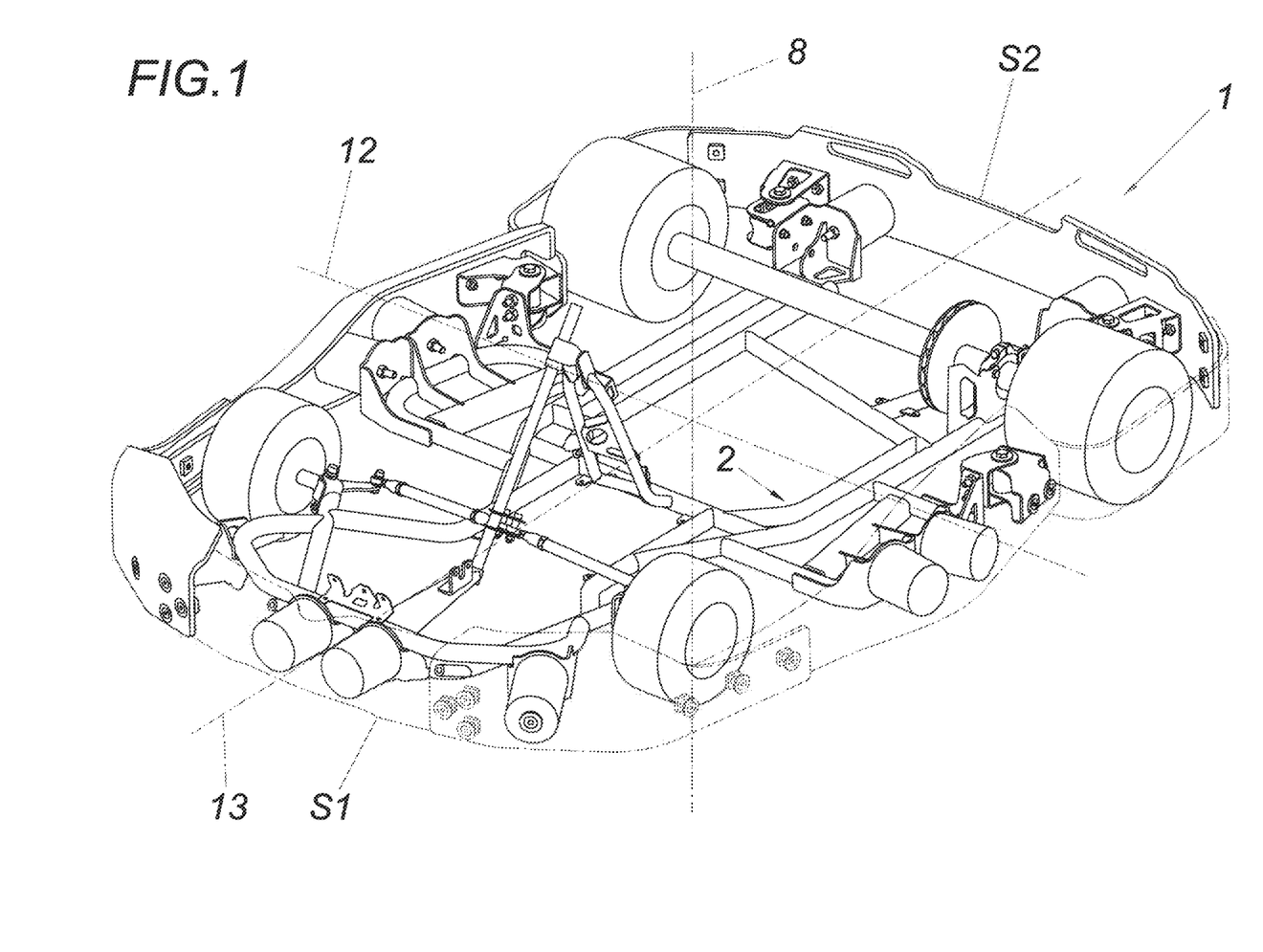
FIG. 1 is a perspective view, taken from a front, left side, of a kart according to an embodiment of the present technology.
Figure 2:
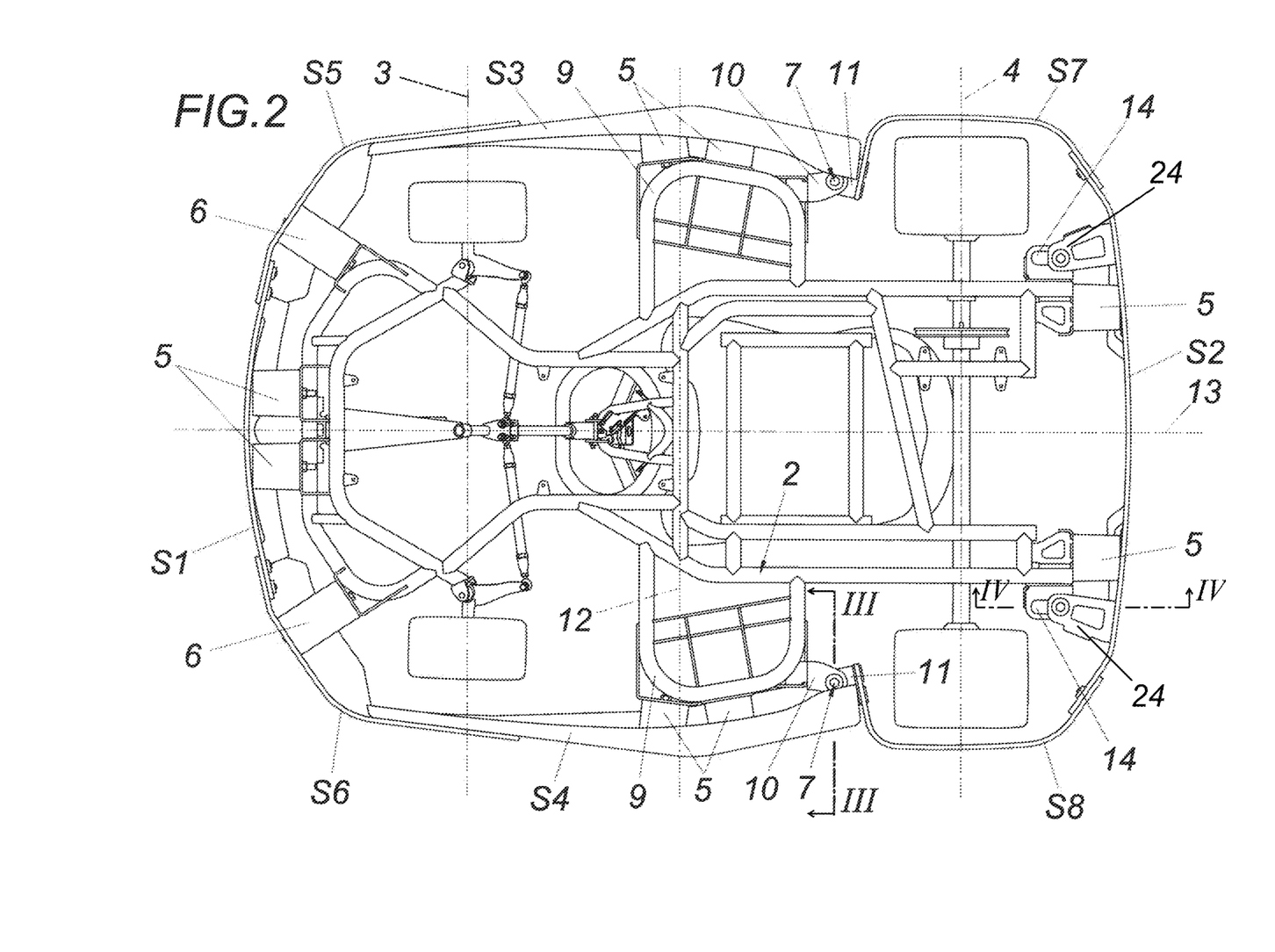
FIG. 2 is a bottom plan view of the kart of FIG. 1.
Figure 3:
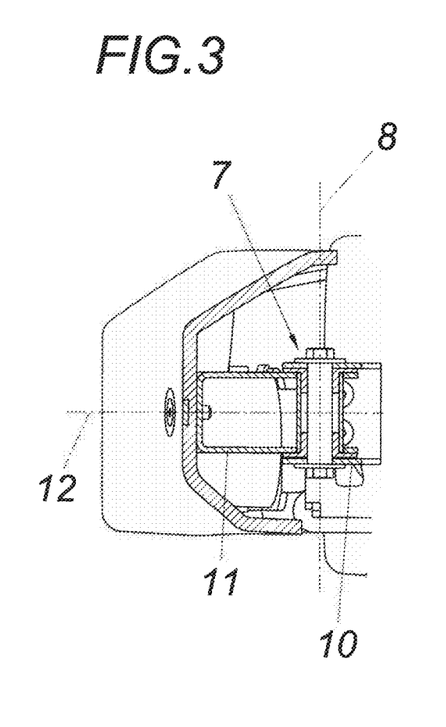
FIG. 3 is a cross-sectional view of part of the kart of FIG. 1 taken along line in FIG. 2.

With reference to FIG. 1, a kart 1 according to an embodiment of the present technology comprises a frame 2, front wheels rotatable about a front axle axis 3 (when the front wheels are steered in a straight ahead direction as shown), rear wheels rotatable about a rear axle axis 4, and an impact protection structure surrounding the frame 2. As shown in FIG. 2, the front and rear wheels are disposed inside the impact protection structure and are protected thereby. In this embodiment, the frame 2 is a tubular steel frame which supports the other vehicle components. For purposes of clarity, vehicle parts that are not relevant to the presently claimed technology, such as the engine, tank, batteries, seat, fairings, etc., are not shown in the drawings. The impact protection structure has at least one front protective element S1, at least one rear protective element S2, and at least one lateral protective element S3, S4 on each side of the frame 2. The protective elements S1, S2, S3, S4 are connected by connecting protective elements S5, S6, S7, S8. Shock-absorbing rubber-elastic dampers are disposed between the frame 2 and the protective elements S1, S2, S3, S4, S5, S6. In the present embodiment, the shock-absorbing rubber-elastic dampers are buffers 5, which transmit only normal forces and practically no transverse forces, and rubber-elastic bearings 6, which transmit normal and transverse forces.

To ensure that the lateral sides of the impact protection structure can absorb and dampen longitudinal and transverse forces well and still be held securely on the frame 2 and be guided in a defined manner in relation to the frame 2, the lateral protective elements S3, S4 are each mounted on a pivot bearing 7 fixed to the frame 2 so that the lateral protective elements S3, S4 can be pivoted about a frame vertical axis 8. The pivot bearings 7 on each side of the frame 2 are disposed near the rear axle axis 4 (closer to the rear axle axis 4 than to the front axle axis 3) between a lateral frame attachment 9 and the rear axle axis 4. Each of the pivot bearings 7 is attached to its corresponding frame attachment 9. Each of the pivot bearings 7 comprises a bearing block 10 fixed to the frame 2 and a bearing pedestal 11 pivotable relative to the bearing block 10. The lateral protective elements S3, S4 and, in this embodiment, also the connecting protective elements S7, S8 each engage the bearing pedestal 11 of a corresponding one of the pivot bearings 7 and are thus connected thereby. Each pivot bearing 7 can be positioned at or behind a laterally extending vertical plane disposed halfway between the front and rear axle axes 3, 4. In the present embodiment, each pivot bearing 7 is positioned in the rear end portion of the corresponding lateral protective element S3, S4 as shown in FIG. 2. The lateral protective elements S3, S4 could also be shorter than shown in the figures.

The lateral protective elements S3, S4 are bent outwards in the central area between the front and rear axle axes 3, 4 in the direction of a frame transverse axis 12, i.e. convex. In the areas near each of the front and rear axle axes 3, 4 the lateral protective elements S3, S4 are pulled in towards the frame longitudinal axis 13. This ensures that the pivot bearing 7 cannot be hit directly in the event of a side impact and that the impact forces can be absorbed by buffers 5 acting as rubber-elastic dampers disposed between the frame 2 and the lateral protective elements S3, S4 in the central area between the front and rear axle axes 3, 4. The buffers 5 engage the protective elements S3, S4 in the central area between the front and rear axle axes 3, 4. This corresponds to the region where the protective elements S3, S4 protrude the farthest to the outside. Each of the pivot bearings 7 is arranged in front of the corresponding rear tire and does not protrude beyond the rear tire laterally outwardly (i.e., towards the outside).

Each of the lateral protective elements S3, S4 indirectly engages the front and rear protective elements S1, S2 via their corresponding connecting protective elements S5, S6, S7, S8. Each of the lateral protective elements S3, S4 is connected to its corresponding connecting protective element S7, S8 via its corresponding bearing pedestal 11.

Two shock-absorbing buffers 5 acting as rubber-elastic dampers are disposed between the frame 2 and the front protective element S1. One rubber-elastic bearing 6 is provided between the frame 2 and the front connecting protective element S5. Another rubber-elastic bearing 6 is provided between the frame 2 and the front connecting protective element S6.

Figure 4:
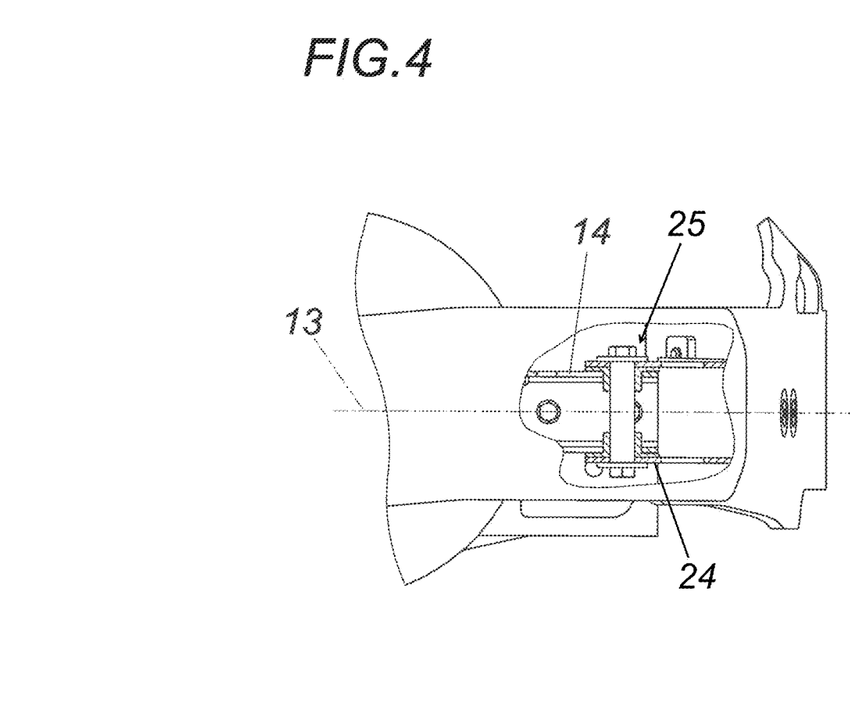
FIG. 4 is a cross-sectional view of part of the kart of FIG. 1 taken along line IV-IV in FIG. 2.
Figure 7:
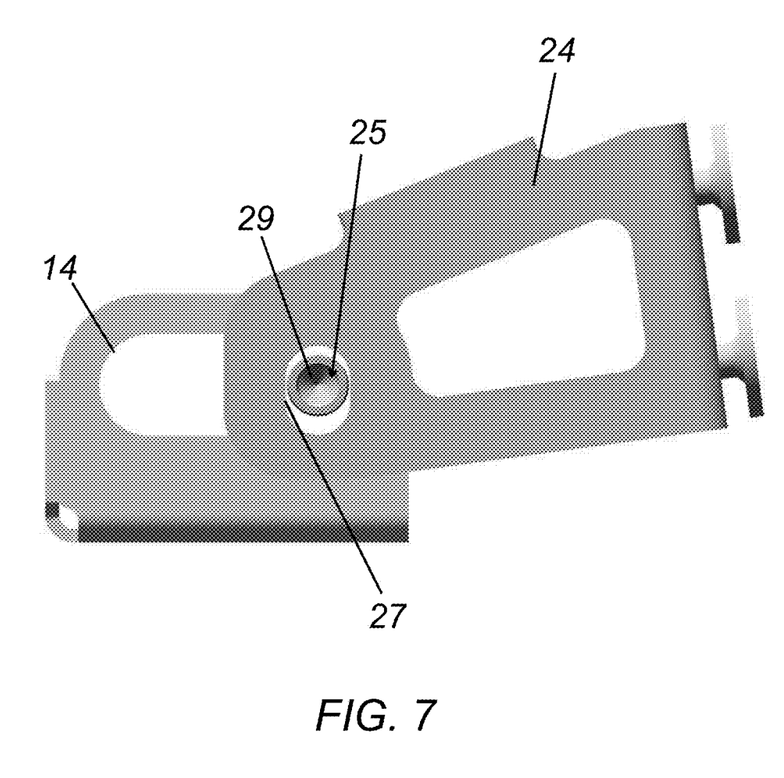
FIG. 7 is a top plan view of a longitudinal guide and a connecting bracket of the kart of FIG. 1.

Two shock-absorbing buffers 5 acting as rubber-elastic dampers are also disposed between the frame 2 and the rear protective element S2. In addition, the rear protective element S2 is pivotally mounted by connecting brackets 24 to longitudinal guides 14 connected to the frame 2 and guided against the spring force of the buffers 5 in the direction of the frame longitudinal axis 13 in a displaceable manner relative to the frame 2. The connecting brackets 24 are mounted to the guides 14 by a pivot bearing 25 (see FIG. 4) similar to the pivot bearings 7. The guides 14 can also permit a defined transverse guidance of the protective element S2. For this purpose, in some embodiments, as shown in FIG. 7, each connecting bracket 24 forms a transverse guide in the form of a laterally-extending slot 27 such that the connecting bracket 24 is movable laterally relative to a fastener 29 of the pivot bearing 25 disposed within the slot 27 and connecting the bracket 24 to the longitudinal guide 14. The pivot bearing 25 thus enables a displacement of approximately 50 mm in the longitudinal direction and approximately 7 mm in the transverse direction.

Figure 5:
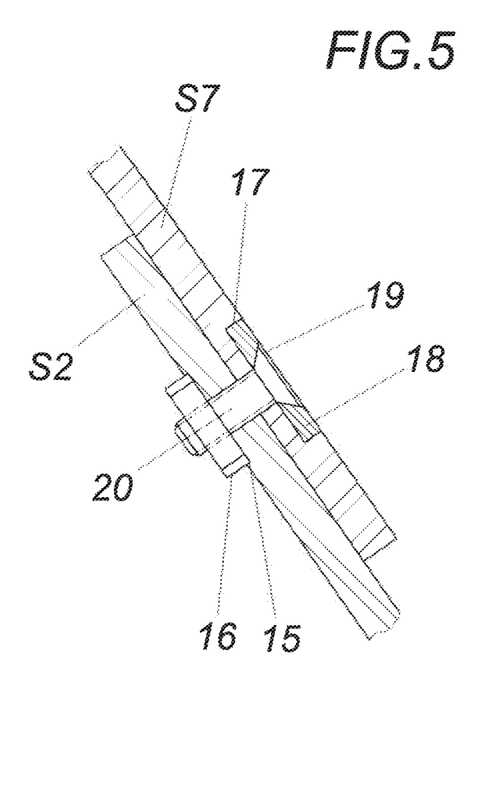
FIG. 5 is a cross-sectional view of a screw connection between two protective elements of the kart of FIG. 1.

Mutually adjoining protective elements S1 to S4 and connecting protective elements S5 to S8 are screwed together via screw connections. As shown in FIG. 5, these screw connections each comprise a nut 16 radially secured in a recess 15 of an associated first protective element (e.g., protective element S2) and a washer 18 radially secured in a recess 17 of a second protective element (e.g., protective element S7) to be connected to the first protective element, with the washer 18 having a conical seat 19 for a conical seat screw 20 engaging the nut 16. The protective elements can thus be screwed together more easily, as the screw connection can initially be easily set in place even if the protective elements do not fit exactly one above the other and, subsequently, when the screw connection is tightened, automatic alignment takes place as a result of the design features.

Figure 6:
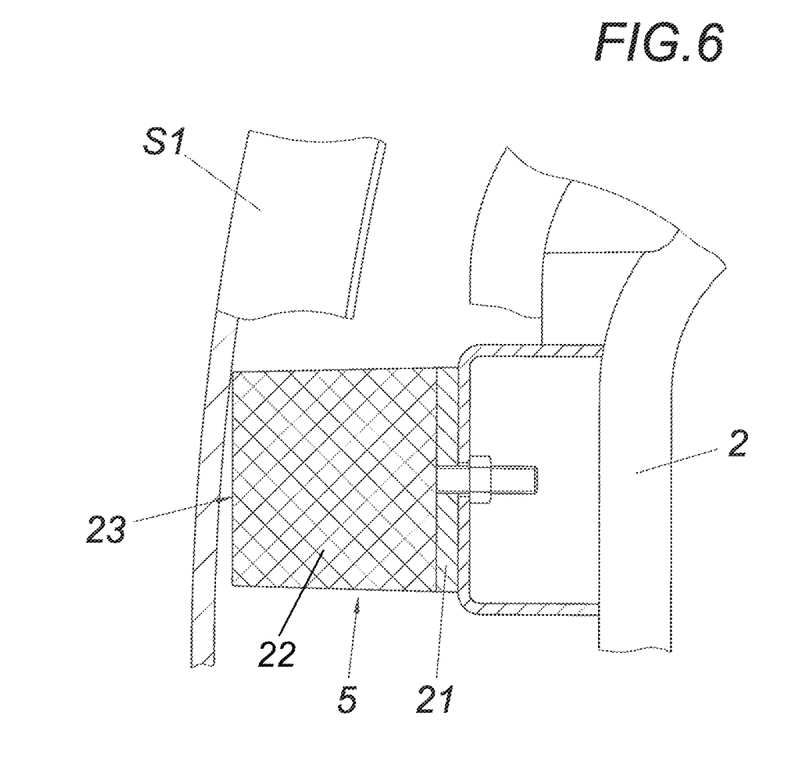
FIG. 6 is a cross-sectional view of a buffer of the kart of FIG. 1.

As shown in FIG. 6, each of the buffers 5 has a mounting body 21 and a buffer body 22 freely projecting from the mounting body 21. The buffer body 22 forms a stop 23 on its side opposite the mounting body 21 for interacting with one of the protective elements S1, S2, S3, S4. The buffer body 22 is made of elastic material, such as rubber or rubber-elastic foam for example.

What is claimed is:

1. A kart comprising:
    a frame;
    front wheels rotatable about a front axle axis;
    rear wheels rotatable about a rear axle axis;
    an impact protection structure surrounding the frame, the impact protection structure comprising a plurality of protective elements, including:
        at least one front protective element;
        at least one rear protective element;
        at least one lateral protective element on each lateral side of the kart;
        at least one front connecting protective element; and
        at least one rear connecting protective element,
        each of the at least one lateral protective element being mounted to a pivot bearing fixed to the frame so as to be pivotally adjustable about a frame vertical axis,
        each of the pivot bearings being disposed closer to the rear axle axis than to the front axle axis,
        each of the pivot bearings comprising a bearing block fixed to the frame and a bearing pedestal pivotable relative to the bearing block,
        each of the at least one lateral protective element engaging the bearing pedestal of a corresponding one of the pivot bearings,
        each of the at least one lateral protective element engaging the at least one front protective element via the at least one front connecting protective element,
        each of the at least one lateral protective element engaging the at least one rear protective element via the at least one rear connecting protective element,
        each of the at least one lateral protective element being connected to a corresponding one of the at least one rear connecting protective element via the bearing pedestal of the corresponding one of the pivot bearings;
    and
    a plurality of shock-absorbing dampers disposed between the frame and the at least one front protective element, the at least one rear protective element, and the at least one lateral protective element on each lateral side of the kart.

2. The kart of claim 1, wherein each of the at least one lateral protective element is bent outwards in a central region of the kart between the front and rear axle axes in a direction of a frame transverse axis, and is drawn in towards a frame longitudinal axis near the front and rear axle axes.

3. The kart of claim 1, wherein:
    the shock-absorbing dampers are buffers; and
    at least one of the buffers is disposed between the frame and each of the at least one lateral protective element in a central region between the front and rear axle axes.

4. The kart of claim 1, wherein each of the at least one front protective element, at least one rear protective element and at least one lateral protective element is affixed to a corresponding one of the at least one front and at least one rear connecting protective elements via a screw connection, each screw connection comprising:

a nut radially secured in a recess of a selected one of the at least one front protective element, at least one rear protective element and at least one lateral protective element; and a washer radially secured in a recess of the corresponding one of the at least one front and at least one rear connecting protective elements to be connected to the selected one of the at least one front protective element, at least one rear protective element and at least one lateral protective element, the corresponding one of the at least one front and at least one rear connecting protective elements having a conical seat for a conical seat screw engaging the nut.

5. The kart of claim 1, wherein:
the shock-absorbing dampers are buffers; and
at least one of the buffers acting as a rubber-elastic damper is disposed between the frame and the at least one front protective element.

6. The kart of claim 1, further comprising at least one rubber-elastic bearing disposed between the frame and at least one of:
the at least one front protective element,
the at least one front connecting protective element, and
the at least one rear connecting protective element.

7. The kart of claim 1, wherein:
the shock-absorbing dampers are buffers;
at least one of the buffers acting as a rubber-elastic damper is disposed between the frame and the at least one rear protective element.

8. The kart of claim 7, wherein the at least one rear protective element is mounted to longitudinal guides connected to the frame and is guided relative to the frame by the longitudinal guides against a spring force of the at least one of the buffers in a direction of a frame longitudinal axis.

9. The kart of claim 1, wherein the shock-absorbing dampers are buffers, each of the buffers comprising:
a mounting body; and
a buffer body projecting from the mounting body, the buffer body forming a stop for interacting with a corresponding one of the protective elements on a side of the buffer body opposite the mounting body, the buffer body being made of elastic material.

10. The kart of claim 9, wherein the buffer body is made of rubber or elastomeric foam.

11. The kart of claim 1, wherein the shock-absorbing dampers comprise elastic material.

12. The kart of claim 11, wherein the elastic material is rubber.

13. The kart of claim 1, wherein the front and rear wheels are disposed inside and protected by the impact protection structure.

14. A kart comprising:
a frame;
front wheels rotatable about a front axle axis;
rear wheels rotatable about a rear axle axis;
an impact protection structure surrounding the frame, the impact protection structure comprising a plurality of protective elements, including:
at least one front protective element;
at least one rear protective element;
at least one left lateral protective element on a left lateral side of the kart, the at least one left lateral protective element being mounted to a left pivot bearing fixed to the frame so as to be pivotally adjustable about a frame vertical axis, the left pivot bearing comprising a bearing block fixed to the frame and a bearing pedestal pivotable relative to the bearing block, the at least one left lateral protective element engaging the bearing pedestal of the left pivot bearing;

at least one right lateral protective element on a right lateral side of the kart, the at least one right lateral protective element being mounted to a right pivot bearing fixed to the frame so as to be pivotally adjustable about the frame vertical axis, the right pivot bearing comprising a bearing block fixed to the frame and a bearing pedestal pivotable relative to the bearing block, the at least one right lateral protective element engaging the bearing pedestal of the right pivot bearing, the left and right pivot bearings being disposed closer to the rear axle axis than to the front axle axis, at least one front left connecting protective element, the at least one left lateral protective element engaging the at least one front protective element via the at least one front left connecting protective element;

at least one front right connecting protective element, the at least one right lateral protective element engaging the at least one front protective element via the at least one front right connecting protective element;

at least one rear left connecting protective element, the at least one left lateral protective element engaging the at least one rear protective element via the at least one rear left connecting protective element, the at least one left lateral protective element being connected to the at least one rear left connecting protective element via the bearing pedestal of the left pivot bearing; and at least one rear right connecting protective element, the at least one right lateral protective element engaging the at least one rear protective element via the at least one rear right connecting protective element, the at least one right lateral protective element being connected to the at least one rear right connecting protective element via the bearing pedestal of the right pivot bearing; and a plurality of shock-absorbing dampers disposed between the frame and the at least one front protective element, the at least one rear protective element, the at least one left lateral protective element and the at least one right lateral protective element.

15. The kart of claim 14, wherein the at least one left and right lateral protective elements are bent outwards in a central region of the kart between the front and rear axle axes in a direction of a frame transverse axis, and are drawn in towards a frame longitudinal axis near the front and rear axle axes.

16. The kart of claim 14, wherein:
the shock-absorbing dampers are buffers;
at least one of the buffers is disposed between the frame and the at least one left lateral protective element in a central region between the front and rear axle axes; and
at least another one of the buffers is disposed between the frame and the at least one right lateral protective element in the central region between the front and rear axle axes.

17. The kart of claim 14, wherein:
the shock-absorbing dampers are buffers; and
at least one of the buffers acting as a rubber-elastic damper is disposed between the frame and the at least one front protective element.

18. The kart of claim 14, further comprising at least one rubber-elastic bearing disposed between the frame and at least one of:
- the at least one front protective element,
- the at least one front left connecting protective element,
- at least one front right connecting protective element,
- at least one rear left connecting protective element, and
- at least one rear right connecting protective element.

19. The kart of claim 14, wherein:
- the shock-absorbing dampers are buffers;
- at least one of the buffers acting as a rubber-elastic damper is disposed between the frame and the at least one rear protective element.

20. The kart of claim 14, wherein the front and rear wheels are disposed inside and protected by the impact protection structure.

* * * * *